W. P. BUCHAN.
SCALE.
APPLICATION FILED JULY 21, 1919.
1,382,269.
Patented June 21, 1921.
3 SHEETS—SHEET 2.
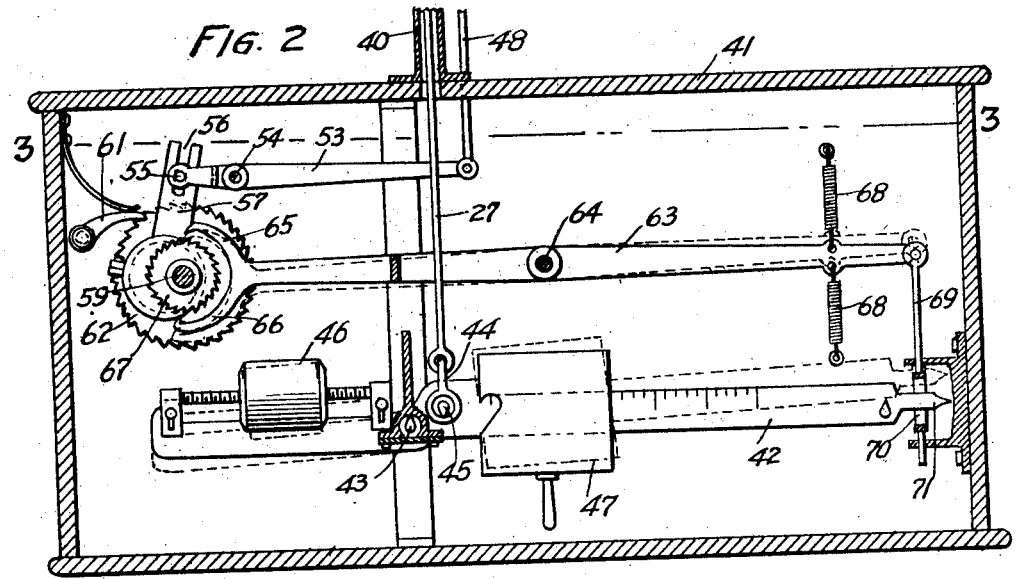
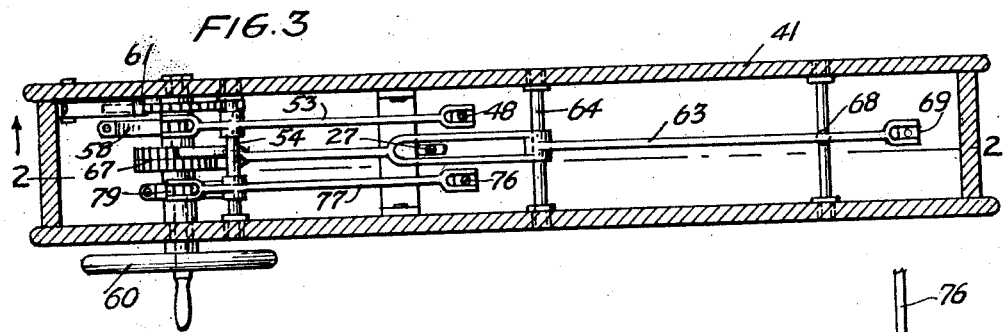
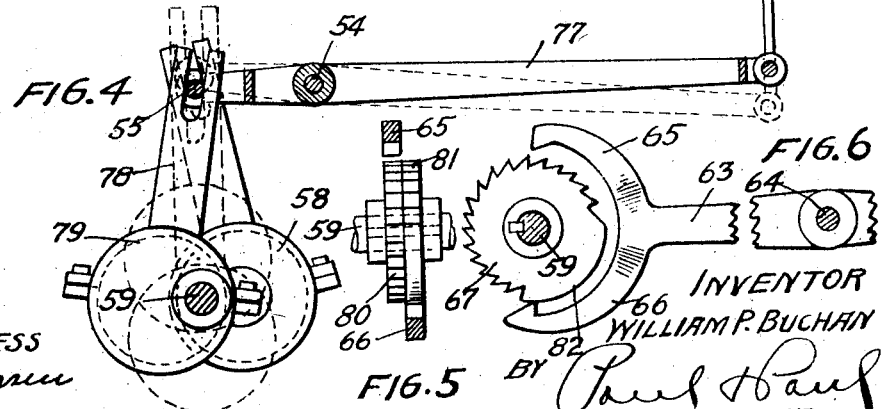
INVENTOR
WILLIAM P. BUCHAN
BY
ATTORNEYS
WITNESS

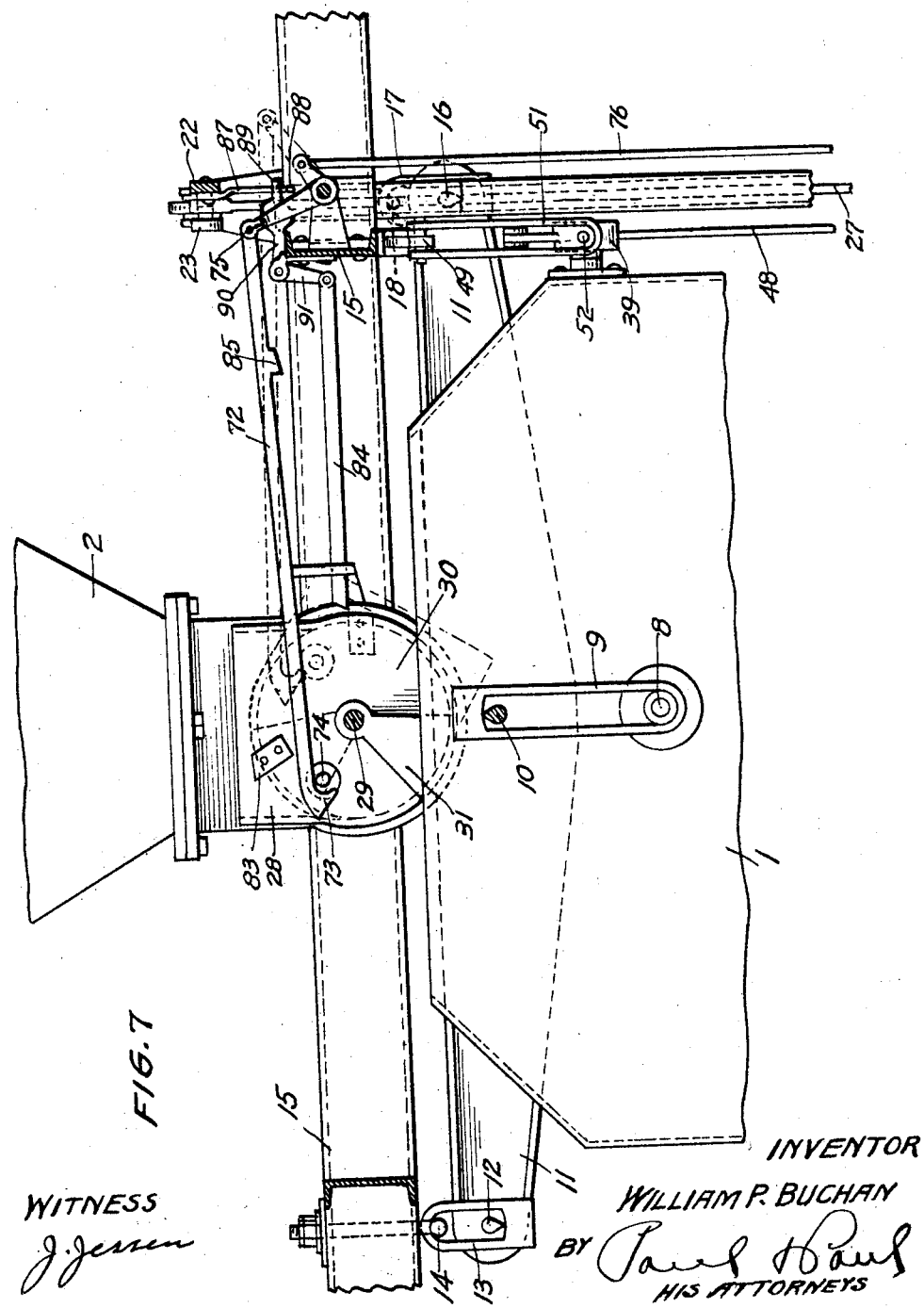

UNITED STATES PATENT OFFICE.

WILLIAM PENNEFATHER BUCHAN, OF MINNEAPOLIS, MINNESOTA.

SCALE.

1,382,269.  Specification of Letters Patent.  Patented June 21, 1921.

Application filed July 21, 1919. Serial No. 312,376.

*To all whom it may concern:*

Be it known that I, WILLIAM P. BUCHAN, a citizen of the Kingdom of Great Britain, resident of Minneapolis, in the county of Hennepin and State of Minnesota, have invented certain new and useful Improvements in Scales, of which the following is a specification.

This invention relates to improvements in the present type of what are termed in this art, semi-automatic weighing scales. Briefly, a present commercially used form of weighing scales is provided with a container to hold matter to be weighed and with a feeding member having an opening to deliver matter to be weighed to the container. This container is normally closed by means of a gate. In this commercial type the container is also provided with a discharge opening and discharge gate, this gate also being normally closed. This apparatus is so arranged that its cycle of operation is as follows: When a predetermined amount of matter has entered the container, the feed gate is automatically closed; the discharge gate is thereafter opened and the contents released, whereupon the discharge gate is automatically closed, and the feed gate is then opened. In these forms of scales, it generally happens that more than the predetermined amount of matter enters the container before the feed gate is closed, due to matter in transit and other causes, and, hence, when the contents are discharged, more than the predetermined amount of the matter weighed is discharged and a record of the exact amount is lost or often unascertained. Scales of this general type are, at present, used for weighing coal in power plants, grain in elevators, juices in sugar factories and other commodities in various industrial plants. In the weighing of grain and similar commodities where the value per unit of weight is relatively high, it is especially described to have accurate and exact weight notations upon which to base computations.

This improvement broadly provides a means for preventing the discharge of the container until an accurate indication is had of the exact amount of matter which is in the container, and also for preventing the opening of the feed gate until the weighing mechanism has indicated whether or not the container is fully discharged. More particularly this improvement provides means manually to open the discharge and feed gates and means to lock against movement the gate-opening means, except when the scale lever is in a balanced position.

An object of the invention is to provide means to aid in the securing of accurate weight indications.

Another object of the invention is to lock the feed and discharge gate-opening means against movement except at predetermined points in the cycle of operations of these scales.

More specifically an object of this invention is to provide means to prevent the discharge of the matter from the weighing container when the weight-indicating mechanism is in other than weight-indicating position.

Other objects of the invention will more fully appear from the following description and the accompanying drawings and will be pointed out in the annexed claims.

A selected embodiment of this improved weighing mechanism has been illustrated in the accompanying drawings and will now be described.

Fig. 2 is a vertical sectional view through the scale beam box, on the line 2—2 of Fig. 3;

Fig. 3 is a horizontal sectional view through the upper part of the box on the line 3—3 of Fig. 2;

Fig. 4 is a detail view of the gate-operating mechanism;

Fig. 5 is a detail view of the ratchet, showing the off-set teeth;

Fig. 6 is a detail view of the ratchet showing the toothless portion.

Fig. 7 is a view in elevation of the upper portion of the container and showing the feed-gate operating mechanism.

Figure 1:
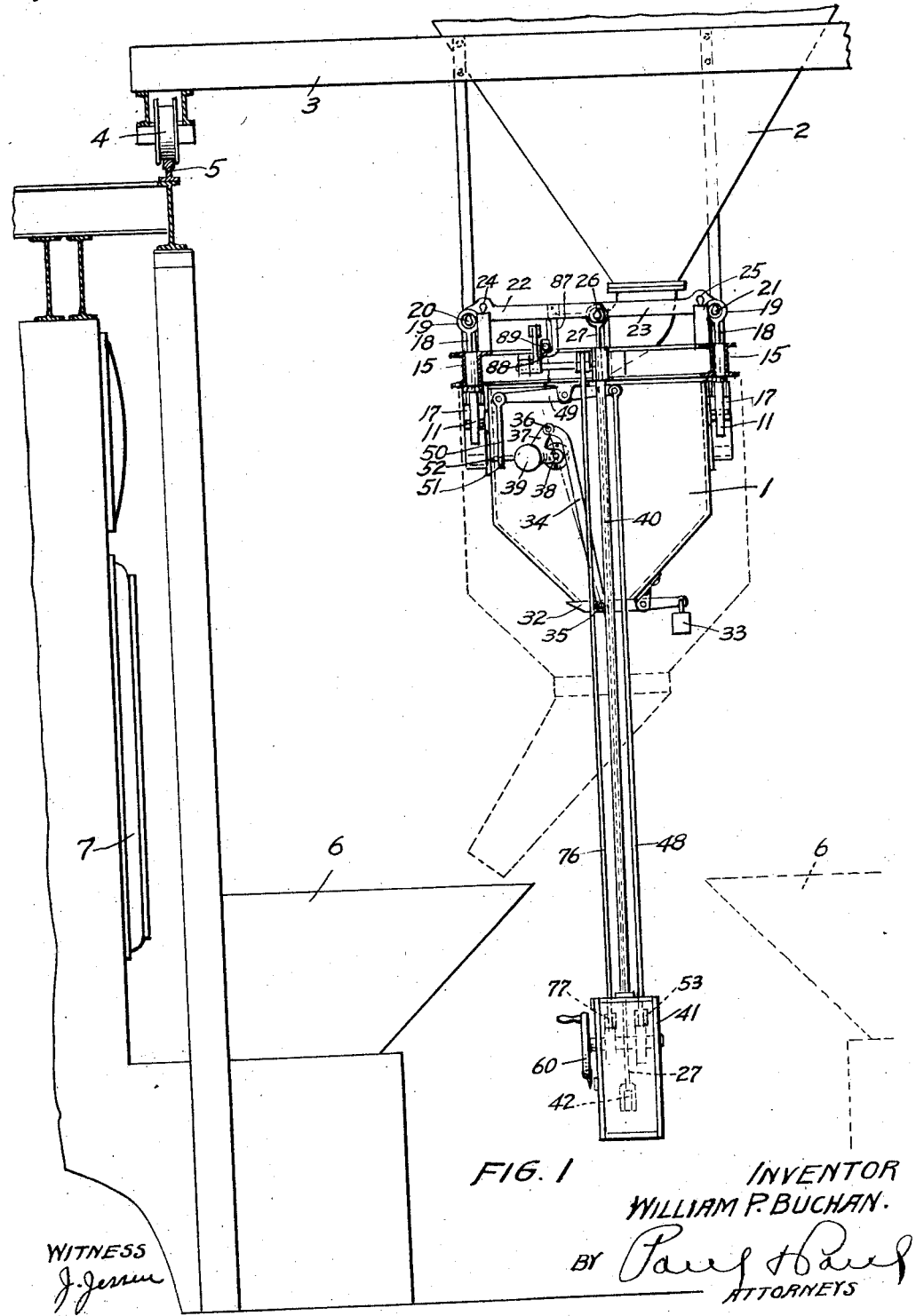
Fig. 1 is a view in end elevation of the scales.

A selected embodiment of this improvement is here shown as used in combination with a well-known type of so-called semi-automatic scales employed in weighing coal while being delivered to boilers in a boiler room. The coal container and feed hopper are usually movably mounted to travel in a battery of boilers. Herein, the container 1, with a feed hopper 2, positioned above it, is suitably supported from an overhead traveler 3 and movably carried by means of a plurality of wheels 4 traveling on rails 5— only a portion of this old apparatus being necessary to be shown. Thus the container may be positioned to discharge coal into the stokers 6 leading directly to the boilers 7.

This present commercial type of semi-automatic scale has a container supported by a lever system so that, when a predetermined amount of coal has been received in the container from the feed hopper 2, the container will descend by the unbalancing of the lever system upon which it is mounted and coincidently the further passage of coal from the feed hopper 2 to the container 1 will be prevented. The container is supported by means of two studs 8 projecting from opposed sides of the container and engaged by links 9 which are in turn carried by two knife edges 10, one being mounted in each of the main opposed levers 11. The mounting of these two opposed and similar levers 11 is shown in Fig. 7, wherein the lever 11 is shown as provided with a knife edge 12, which is carried by the link 13 supported by the rod 14 carried by the main frame 15 of the scales. Each of the opposite ends of these similar levers 11 is provided with a knife edge 16 carried by a link 17 which in turn is supported by a rod 18. These similar rods 18 are shown in Fig. 1 as terminating in loops 19 which are held, against any downward pull due to a load in the container, by the two knife edges 20 and 21 carried by the similar secondary levers 22 and 23. These secondary levers are each pivotally mounted in the frame of the scales, lever 22 being so mounted by its knife edge 24 and lever 23 by its knife edge 25. Each of the levers 15 is connected by a knife edge 26 to the main scale rod 27. As the pivotal points of these secondary levers 22 and 23 are between their respective load-bearing knife edges, it results that the downward pull by the container upon the outer ends of the levers entails an upward thrust upon the main scale rod 27.

Before describing and indicating the function of this rod 27, the feed hopper, feed chute and feed gate portions of this device which are in present commercial use will be briefly noted. The feed hopper 2 terminates in a chute leading to a gate 28 mounted on a shaft 29 and adapted to turn thereon. This gate is substantially semi-cylindrical. It is closed at its end 30 opposite the feed chute and longitudinally open on what may be called the upper portion when it is in normal, closed or non-feeding position. This longitudinal opening is shown in Fig. 7 where, in dotted lines, the semi-cylindrical gate is shown rotated into feeding position. Usually a counter-balance is secured to the gate shaft so that the gate automatically closes and is normally held closed. Such is the function of the counterweight 31.

In this improved type, the discharge gate 32 is pivotally mounted on the lower side of the container and closes the opening in the bottom of the container. A counter-weight 33 is secured to the gate on that portion of the gate projecting beyond the pivotal mounting so that the gate is normally held closed. In order that the gate, when closed, may so remain against the weight of the coal or other matter fed into the container there is provided an arm 34 pivoted to the gate by the pin 35 and by the pin 36 to one arm of the bell crank lever 37. This bell crank lever is pivoted by the pin 38 to the side of the container 1 and is also provided with a counterpoise 39. Obviously, when the three pivot pins 35, 36 and 38 are in alinement, as indicated by the dot and dash line in Fig. 1, the gate 32 is effectually locked against opening until the alinement is disturbed.

In this new improvement in semi-automatic scales, there is disclosed a novel means for unlocking the discharge gate by disturbing the locking alinement referred to, so that the matter in the container may be discharged. Furthermore, novel means are herein provided to lock the feed gate 28 against opening. The two gates, in this selected embodiment, are adapted to be manually opened. Such operation in this improved scale is only possible when the weight-indicating means is in a predetermined position.

The rod 27, to which reference has heretofore been made, downwardly extends from the secondary levers through a tubular support 40 which is secured at its upper end to the main scale frame and which carries at its lower end the weight indicating mechanism. This mechanism may be of any suitable form, and a simple and efficient mode of achieving the desired results is shown in this selected embodiment of the invention. This tubular support 40 carries a box 41 which incloses a balance lever or beam 42 pivotally mounted on the box frame on the knife edge 43. The rod 27 is connected to this beam 42 by means of the link 44 which engages the knife edge 45 carried by the beam. As shown in Fig. 2, a balance ball 46 is carried in threaded engagement on one arm of this beam and is movable to correct inaccuracies in the well-known manner. The other arm of the beam carries a poise 47 which is movable over this arm to effect the upward thrust exerted by the rod 27 on this beam arm when there is matter in the container, and to bring this beam into balanced position, thereby to indicate, by means of the graduations on the arm, the weight of the container contents.

The novel means for opening the normally closed discharge gate of the container is manually operable. It comprises the rod 48, which is pivotally connected at its upper end to a lever 49, pivotally mounted on the main frame. The opposite end of this lever 49 has pivotally connected thereto a rod 50 which terminates in a detent 51 turned at an angle to the rod so as operatively to engage a pin 52, which is secured to the bell crank lever 37. A downward pull of the rod 48 is thus translated into an upward movement of the pin 52 which effectively disturbs the locking or dead-center alinement of the pivot pins 35, 36 and 38, and permits the gate 32 to drop into open discharging position by means of the weight of matter in the container. The downward pull on the rod 48 is effected by means of the gate lever 53, which is pivotally mounted on a shaft 54 in the box 41. The end of this gate lever 53, which is opposite to the rod 48 is bifurcated and carries a pin 55 adapted slidably to engage in a slot 56 provided in one end portion of a bar 57. The opposite end of this bar 57 is secured to an eccentric 58 mounted upon and rotatable with a shaft 59. This shaft 59 is rotated by means of a hand-wheel 60 mounted outside of the scale beam box 41. To prevent rotation of this wheel 60 in a direction other than clockwise, a suitable means is provided, such as a spring-pressed pawl 61, which engages the teeth of a ratchet 62, fixed to and rotatable with the shaft 59. Therefore, when the eccentric 58 is rotated in a clockwise direction from its full line position to the dotted line position as indicated in Fig. 4 the quarter turn will upwardly thrust the pin end of the gate lever 53 and thus entail a downward pull of the rod 48 and unlock the discharge gate of the container.

In this improved construction, means are provided to lock this manually operated discharge gate-opening means against movement when the scale lever is in other than balanced weight-indicating position. And, in this disclosure of the invention, such locking means are afforded by a pawl and ratchet in combination with a supplemental locking lever whose movement is governed by the main scale beam.

This supplemental locking lever 63 is pivotally mounted on the rod 64, supported in the frame of the box 41. One end of this locking lever 63 terminates in two arms 65 and 66, each bearing a terminal tooth to engage in the peripheral teeth of the ratchet 67. The terminal teeth on the arms 65 and 66 of this locking lever 63 are normally held out of contact with the peripheral teeth of the ratchet 67 by the opposed springs 68. Movement of this supplemental locking lever 63 in either direction from its normal position causes one or the other of the terminal teeth to engage the ratchet 67 and prevent movement of the shaft 59 in the only direction which it is permitted to move by the pawl 61. A rod 69 is pivotally secured to the end of the locking lever 63. This rod 69 terminates in a trig loop 70 and receives freely movable therein the reduced end portion 71 of the scale beam 42. When the scale beam is in balanced position, as shown in full lines in Fig. 2, the reduced portion 71 of the beam 42 is out of contact with the movable trig loop 70. But, when matter is within the container 1 and the rod 27 is upwardly pulled by the weight thereof, the end portion of the scale beam will upwardly move to the dotted line position shown in Fig. 2 and will at the same time upwardly move the movable trig loop. This causes the locking lever 63 to leave its normal position and to assume the dotted line position shown. In this position the tooth on the upper arm 65 engages the ratchet 67 and locks the shaft 59 against movement. Similarly, when the poise 47 is moved outwardly along the beam 42 and there is less weight of matter in the container than that which can be counterbalanced by the poise 47 in the position to which it has been moved, the scale beam 42 will descend, engage the trig loop 70, move the locking lever 63 and cause the tooth on the lower arm 66 to engage the ratchet 67 and lock the shaft 59 against rotation.

When the scale beam 42 is in balanced position, as for example, when it is in weight-indicating position, the trig loop 70 is not engaged and the two locking teeth remain out of engagement with the ratchet 67, as the supplemenal locking lever 63 is held in normal balanced position by the springs 68.

Therefore, the means for opening the discharge gate is locked against movement except when the scale beam is in balanced position, which position in this case is also the weight indicating position.

In this improved construction novel means are also afforded for manually operating the feed gate 28. As heretofore noted, this feed gate is rotatably mounted on a shaft 29, to which is secured a weight 31, which functions to hold the gate in closed position. To open the gate, there is provided a bar 72 which terminates in a hook 73 engageable with a pin 74 secured to the end face of the feed gate. Retraction of this bar rotates the feed gate to its open position. The opposite end of this bar 72 is pivotally connected to an arm 75 of a bell crank lever pivoted to the main frame of the scales. The other arm of this bell crank lever has pivotally connected thereto a rod 76. This rod 76 downwardly extends, as shown in Fig. 1, to the scale beam box, where it is secured to a gate lever 77 similar in function and mounted to the gate lever 53, which has heretofore been described. The bifurcated, pin-end of this lever 77 is adapted slidably to engage a bar 78, which is secured to an eccentric 79 rotatable with the shaft 59. The movement of this lever 77 is thus controlled by the hand wheel 60.

The eccentrics 58 and 79 are diametrically opposed on the shaft 59 on which they are mounted, and, as these terminal bars 57 and 78 are open at the top, there is obviously a half cycle of lost motion for each. That is, the working travel of each eccentric is the first quadrant above the horizontal position shown in Fig. 4. Thus, both gates cannot be opened at the same time and permit matter to pass unweighed.

In the structure so far described, it is obvious that the manually operable means for opening the feed gate and discharge gates are locked against movement except when the scale beam is in balanced position, which is also the weight-indicating position of the beam. However, for greater facility in the operation of the scales it is deemed advisable to provide means whereby the feed gate may be opened after the poise 47 on the scale beam has been shifted to a position such that the beam will assume balanced position when a predetermined amount of matter has been fed to the container. In other words, provision must be made to permit rotation of the hand-wheel 60 a distance sufficient to open the feed gate after the scale beam is unbalanced, or has descended, due to the shifting of the poise 47 outwardly on the scale beam to a predetermined weight indication. This is achieved by providing the ratchet 67 with two sets of peripheral teeth and off-setting the terminal arms 65 and 66 of the locking lever 63. Such a construction is shown in detail in Figs. 5 and 6 wherein the upper arm 65 is off-set to engage the continuous peripheral teeth 80. The lower arm 66 is off-set to engage the non-continuous peripheral teeth 81. This portion of the ratchet 67 is provided with a peripheral non-toothed portion 82. This smooth or non-toothed portion 82 is so related to the eccentrics that it is only presented to the terminal tooth on the lower arm 66 of the locking lever when both the feed and discharge gates are in closed position. Such positions are automatically assumed by both gates immediately after the container has discharged its contents. It is usually at this point in the cycle of operation of these scales that the poise 47 is moved by the operative along the beam 42 to a predetermined point so that the scale beam will balance when the indicated amount of matter has been fed to the container. When the poise is shifted, the beam tends to descend and, if it were not for the peripheral non-toothed portion 82, the tooth of the lower arm 66 would engage in the teeth 81, and the hand-wheel could not be rotated in order to open the feed gate. At such position, however, the tooth on the lower arm 66 rests upon, and may travel over, this smooth portion 82, which is of such radial distance from its shaft that the tooth on the lower arm 66 in riding thereover functions to support one end of the locking lever 63 and thus to retain the scale beam in its balanced position, during the shifting of the poise 47 and the rotation of the hand-wheel 60 to open the feed gate. When the feed gate has been fully opened by the quadrantal traverse of the eccentric, the tooth of the arm 66 enters the first peripheral tooth and locks the opening rod against movement. The feed-gate opening means is thus only operable when the scale beam is in balanceed position although it is not necessarily a weight-indicating position.

The feed gate, as above noted, is opened upon retraction of the bar 72 through a downward pull on the rod 76. The feed gate is thus rotated to the open, dotted-line position shown in Fig. 7, and means are provided to detain it in open feeding position. Detent 83 is affixed to the end of the feed gate and is provided with a cam surface which, when the feed gate is rotated to open position, rides over the cam surface of a detent bar 84, which is normally positioned in the path of the detent 83. The detent 83 is thereafter held by the detent bar 84. A releasing cam 85 is provided on the bar 72. This cam is adapted to rise over the adjacent frame portion and cause the bar 72 to be elevated when it is drawn to a fully retracted position. This elevation functions to cause the hook 73 to be disengaged from the pin 74. The bar 72 is thus free to return to normal extended position which it automatically does by gravity acting through the counter-weight 86 secured to the bell crank lever 75. The bar 72 may thus return to extended position while the feed gate is held in open position by means of the detent 83 and the detent bar 84. When the container has received a sufficient amount of matter to cause the scale beam to descend toward balanced position, the container will descend, causing the secondary lever 22 to ascend, thereby carrying upwardly the rod 87 (see Fig. 1). This rod terminates in an off-set portion 88, which engages a pin 89, extending from one arm 90 (see Fig. 7) of the bell crank lever mounted in the scale frame to the other arm 91 to which the detent bar 84 is connected. The detent bar 84 is thus retracted upon the descent of the container and thereby withdrawn from contact with the feed gate detent 83 so that the feed gate returns to normal, closed position under the influence of the counter-weight 31. The detent bar 84 is provided with a counter-weight attached to the arm 90 of the detent bell crank lever. The function of this weight is to cause the detent bar 84 to assume its normal extended position in the path of the feed gate detent 83 when the container is raised.

The discharge gate of the container, as above noted, is likewise adapted to close automatically. When the discharge gate is manually unlocked by means of the hand-wheel 60, the weight of the container contents opens, and holds the gate open, to permit passage of the matter from the container. When the container is discharged, the counter-weight 33 causes the gate to be raised into normal closed position, and to be locked in such position by the alinement of the pivot pins 35, 36 and 38.

The cycle of operation of the scales is as follows: Assume the container empty and the feed hopper 2 filled with a matter, as, for example, coal; the feed gate and discharge gate in normal closed position, and the scale poise 47 at zero point on the beam, which is then in balanced position. The operative then sets the poise 47 to indicate a predetermined number of pounds. The scale beam is held in balanced position and against descending by means of the contact of the toothed arm 66 on the smooth portion 82 of the locking ratchet 67. Upon rotation of the hand-wheel 60, substantially a quarter turn as shown in the drawings, the feed gate may be opened and the tooth of the arm 66 enters one of the peripheral teeth 81, the scale beam descends from balanced position and the wheel is locked against further movement so long as the scale beam is in unbalanced position. The coal may then pass from the feed gate to the container and when the container descends due to the presence therein of an amount of coal sufficient to counter-balance the poise 47 on the scale beam, the detent bar 84 will be withdrawn from engagement with the detent 83 and the feed gate will automatically close.

In order to open the discharge gate it is necesary that the operative move the poise 47 on the scale beam to such position that the scale beam will assume an accurate weight-indicating position, i. e., balanced position. This poise shifting or re-weighing is necessary as it generally happens that more coal or other matter is fed to the container than is sufficient to cause the scale beam to assume the balanced position. In other words, in scales of this type, the closing of the automatic feed cut-off is not sufficiently instantaneous and there is frequently a larger amount of coal fed into the container than that indicated by the predetermined position of the weight on the scale beam. Hence, it is desirable that the operative be given an accurate indication of the weight of the contents of the container before the container can be discharged. This accurate weighing is increasingly desirable as the value per unit of weight of the matter handled is higher. When the poise is shifted to accurate weight-indicating position the scale beam will assume a balanced position and the two toothed arms 65 and 66 of the locking lever 63 will both be out of contact with the teeth 80 and 81 of the ratchet 67. The hand-wheel 60 can then be rotated to cause the eccentric to actuate the rod 48 and thus to disturb the locking alinement of the pivots of the discharge gate. The discharge gate then auomatically opens under the influence of the weight of the contents in the container. When the container is discharged, the counter-weight 33 automatically closes the discharge gate and causes it to reassume locked, closed position. If the container is not fully discharged, or the empty container has not been properly balanced, such fact will be indicated by the scale beam, which will not assume a balanced position and the weight of the coal held in the container may be determined by the shifting of the poise 47 on the scale beam, to balanced beam position whereby accurate indication is afforded of the amount discharged, or the balance ball must be adjusted.

It is to be understood that the construction disclosed herein is illustrative but not restrictive and that the same may be modified within the meaning and scope of the claims which follow.

Having thus described my invention, what I claim as new, and desire to secure by Letters Patent, is:

1. Weighing scales having in combination, a container to hold matter to be weighed, the container having a discharge opening, a gate normally closing the discharge opening, a feed member having an opening to feed matter to said container, a gate normally closing the feed opening, a balance lever connected to said container and adapted to assume a balanced position to indicate weight of container contents, manually operable means to open the feed gate and the discharge gate, and means controlled by the balance lever to lock said gate-opening means against operation except when the balance lever is in balanced position.

2. Weighing scales having in combination, a container to hold matter to be weighed, the container having a discharge opening, a gate normally closing the discharge opening, a balance lever connected to said container and adapted to assume balanced position to indicate weight of container contents, manually operable means to open the gate to discharge said contents and means controlled by the balance lever to lock said gate-opening means against operation, except when the lever is in balanced weight-indicating position.

3. Weighing scales having in combination, a container to hold matter to be weighed, the container having a discharge opening, a gate normally closing the discharge opening, a feed member having an opening to feed matter to said container, a gate normally closing the feed opening, a balance lever connected to said container and adapted to assume a balanced position to indicate weight of the container contents, manually operable means to open said feed gate and discharge gate, means controlled by the balance lever to lock the discharge-gate-opening means against operation, except when the balance lever is in balanced weight-indicating position, and means controlled by the balance lever to lock the feed-gate-opening means against operation except when the balance lever is in balanced position.

4. Weighing scales having in combination, a container to hold matter to be weighed, a balance lever connected to said container, poise movable on said lever whereby the lever will assume balanced position when a predetermined amount of matter has been fed to the container, a feed member having an opening to feed matter to said container, a gate normally closing said feed opening, manually operable means to operate said feed gate, means controlled by the balance lever to lock said gate-opening means against operation except when the lever is in balanced position, and means to cause the lever to assume balanced position to permit opening of the feed gate after the lever has been unbalanced by movement of the poise to a predetermined weight indication.

5. Weighing scales having in combination, a container to hold matter to be weighed, a container having a discharge opening, a gate normally closing the discharge opening, a feed member having an opening to feed matter to said container, a gate normally closing the feed opening, a balance lever connected to said container and adapted to assume a balanced position to indicate weight of container contents, manually operable means to open the feed gate and the discharge gate, means controlled by the balance lever to lock said gate-opening means against operation except when the balance lever is in balanced position and to prevent opening of both of said gates at the same time.

6. Weighing scales having in combination, a container to hold matter to be weighed, the container having a discharge opening, a gate normally closing the discharge opening, a balance lever connected to said container and adapted to assume balanced position to indicate weight of container contents, manually operable means to open the gate to discharge said contents, means to cause the discharge gate automatically to close when container contents are discharged, and means controlled by the balance lever to lock said gate-opening means against operation, except when the lever is in balanced weight-indicating position.

7. Weighing scales having in combination, a container to hold matter to be weighed, a balance lever connected to said container to indicate weight of container contents, a feed member having an opening to feed matter to said container, a gate normally closing said feed opening, manually operable means to open said feed gate, means to detain said gate in open feeding position, means automatically operable to cause said gate to assume normal closed position when a predetermined amount of matter has been fed to the container, and means controlled by the balance lever to lock said gate-opening means against operation except when the balance lever is in balanced position.

8. Weighing scales having in combination, a container to hold matter to be weighed, the container having a discharge opening, a gate normally closing the discharge opening, a feed member having an opening to feed matter to said container, a gate normally closing the feed opening, a balance lever connected to said container and adaped to assume balanced position to indicate weight of container contents, manually operable means to open the feed gate and the discharge gate, a supplemental locking lever movable to lock the gate-opening means against operation, and means to cause the supplemental lever to move to locking position upon unbalancing of the balance lever.

In witness whereof, I have hereunto set my hand this third day of July, 1919.

WILLIAM PENNEFATHER BUCHAN.